(12) United States Patent
Wiedenmann (10) Patent No.: US 6,199,637 B1
(45) Date of Patent: Mar. 13, 2001

(54) SUBSOILING MACHINE

(75) Inventor: Georg Wiedenmann, Rammingen (DE)

(73) Assignee: Wiedenmann GmbH, Rammingen (DE)

(*) Notice: Subject to any disclaimer, the term of this patent is extended or adjusted under 35 U.S.C. 154(b) by 0 days.

(21) Appl. No.: 09/230,864

(22) PCT Filed: Jul. 30, 1997

(86) PCT No.: PCT/DE97/01616

§ 371 Date: Jun. 17, 1999

§ 102(e) Date: Jun. 17, 1999

(87) PCT Pub. No.: WO98/05191

PCT Pub. Date: Feb. 12, 1998

(30) Foreign Application Priority Data

Jul. 31, 1996 (DE) .............................................. 196 30 961

(51) Int. Cl.$^7$ ................................................ A01B 45/02
(52) U.S. Cl. ................................................ 172/21; 172/699
(58) Field of Search ........................... 172/699, 21, 22, 172/62, 123

(56) References Cited

U.S. PATENT DOCUMENTS

| | | | |
|---|---|---|---|
| 3,204,703 | * 9/1965 | Hansen | 172/21 |
| 4,632,189 | * 12/1986 | Rizzo | 172/22 |
| 5,570,746 | * 11/1996 | Jones et al. | 172/22 |

FOREIGN PATENT DOCUMENTS

| | | |
|---|---|---|
| 4323315 | * 1/1995 | (DE) . |
| 0037595 | * 10/1981 | (EP) . |
| 89/12381 | * 12/1989 | (WO) . |
| 91/07076 | * 5/1991 | (WO) . |

* cited by examiner

Primary Examiner—Christopher J. Novosad
(74) Attorney, Agent, or Firm—Max Fogiel (57) ABSTRACT

A movable implement for loosening soil below ground, in which a row of blades with blade holders are located perpendicular to a direction of motion of the implement. A supporting arm has one end articulated to each blade, and a frame is articulated to another end of the supporting arm. The supporting arm is engaged by a connecting rod of a crank device, which operates in a vertical plane parallel to the direction of motion. The supporting arm mounts a blade adjustment lever with two arms. The adjustment lever pivots coaxially with an articulating shaft. A stop is mounted on a downward-extending arm of the blade-adjustment lever, and points below the articulating shaft. A lever-adjusting device has a variable angle to the supporting arm for varying the angle of the blade to the ground. A spring forces a blade holder against the stop. The blades are forced away from the stop during movement of the implement.

18 Claims, 9 Drawing Sheets

SUBSOILING MACHINE

BACKGROUND OF THE INVENTION

Various embodiments of implements for deeply loosening soil are known. They have blades that are mounted in an adjustable blade holder and pivot up and down within a plane paralleling the progress of the vehicle, forced against a stop by a spring. The stop ensures that each blade before entering the soil will assume a specific angle that at least approximates the angle the force is applied at. The blade enters the soil as the vehicle progresses. The soil forces the blade to pivot, but not enough to break up the ground when retracted. The slight shifting of the blade in the soil out of the angle established by the stop lifts the blade against the force of the spring. Once free of the soil, the blade will be pivoted back again by the spring into its disengaged position against the stop. The blade or a row of blades is engaged in a known manner by a crank that rotates as the vehicle progresses to an extent that establishes how far the blade will enter the soil. An implement of this genus is known from U.S. Pat. No. 3,204,703 for example.

European Patent discloses a parallel position of the blade over a total cycle of motion, allowing the blade's penetration to be adjusted just by raising and lowering a frame in relation to a support, a roller, that rests on the ground. The stop can also be adjusted independently to vary the angle of the blade to the ground in order to control how the soil is loosened.

SUMMARY OF THE INVENTION

The object of the present invention is an implement of the aforesaid genus that will not only be simpler, stronger, and easier to maintain, but will also facilitate varying both the angle and the depth of penetration of the blade.

This object is attained in an implement of the aforesaid genus in accordance with the present invention for deeply loosening soil, below the turf for example, that either travels under its own power or can be attached to a tractor, with a row of blades or blade holders perpendicular to the direction of progress, whereby each blade or holder is articulated to one end of a supporting arm and the other end of the supporting arm is articulated to a frame, whereby the frame is engaged by a connecting rod, especially a crank mechanism, that operates in a vertical plane paralleling the direction of progress, whereby a blade-adjustment lever with two arms is mounted on the frame and pivots coaxially with the tool holder's articulating shaft, whereby a stop is mounted on the downward-extending arm of the lever and points below that shaft, whereby a lever-adjusting mechanism engages the upward-extending arm of the lever and varies its angle to the supporting arm and hence, by way of the stop, the angle of the blade to the ground, whereby a spring assembly forces the blade holder against the stop, and whereby the resistance exerted by the soil as the implement progresses forces the blade away from the stop.

The position of the stop on, and the engagement of the lever-adjusting mechanism with, the arms of a blade-adjustment lever that pivots coaxially with the shaft of the blade holder makes it possible not only to direct the stop precisely at the section of the holder whereof the motion is to be stopped no matter how far the lever has been pivoted, but the adjustment is also carried out on the arm of the blade-adjustment lever pointing away from the stop and above the common articulating shaft at the end of the supporting arm pointing away from the pivoting bearing, allowing access to the lever-adjusting mechanism in order to vary the angle of the blade, away from the ground and above the supporting arm at the end of the arm extending backwards in relation to the direction of progress. The lever-adjusting mechanism is accordingly positioned where it cannot be contaminated by the soil being cultivated as well as within easy access.

Similarly away from the soil and in consideration of the overall demand for space, the spring assembly is preferably positioned next to the supporting arm in the form of two parallel tension springs preferably attached to one and the same side of the arm, whereas at least some of the components of the lever-adjusting mechanism extend along the other side, as seen from above, of the arm, which is preferably composed of two struts.

The lever-adjusting mechanism can comprise longitudinally variable components accommodated between two points of encounter, one at the free end of the upward-extending arm of the blade-adjustment lever and the other at least in the vicinity of the stationary articulation of the supporting arm to the implement frame, for each individual blade holder or associated lever in the row extending across the direction of progress. Tensioning-screw locking mechanisms and thread-adjustable linkages operated from the downward-extending end of the supporting arm are examples of such longitudinally variable components.

One particularly preferred embodiment includes a central shaft that shifts all the blade-adjustment levers at once. This central lever-shifting shaft is connected to the free ends of the upward-extending arms of the blade-adjustment lever by way of booms secured tight to the shaft and by way of connecting rods. The length of the rods can be fixed or altered by means of longitudinally variable components. The shaft can be adjusted, preferably continuously, to, and secured in, various positions in relation to the frame by means of a manually operated lever fixed to it. At least one row of, and preferably all, the levers can accordingly be similarly pivoted to various angles in relation to their associated supporting arms. Thus, the angle between the blades or blade holders and the ground can be varied by repositioning the stops on the lower arms of the blade-adjustment levers as well as by a pivoting motion on the part of the common blade-adjustment shaft.

In still another preferred embodiment, both the angle the blades are inserted into the ground at and the depth they are inserted to can be established simultaneously. Thus, establishing the depth will simultaneously establish the angle, and there will be no need to establish each separately. The height-establishing motion of the frame in relation to the roller that rests on the ground and supports it can for this purpose be transmitted by a pickup on the central lever-shifting shaft.

The stop at the free end of the downward-extending arm of the two-armed blade-adjustment lever can be a resilient and impact-accommodating component. It can alternatively be or be provided with a shock absorber in the form of a pneumatic or in particular hydraulic piston-and-cylinder mechanism. In the event of a piston-and-cylinder mechanism, the piston rod, which will preferably be the component exposed to the impact of the blade holder, will be sealed off dust-tight from the cylinder by a bellows. Valves in the piston and/or in a cylinder-interior bypass can ensure adjustment of the shock absorption and of the return stroke of the piston to the vehicle's drive mechanism even at high forward speeds. The shock absorber in one preferred embodiment can be adjusted, preferably by means of a counternut in the area facing away from the ground, to ensure that the particular shock-absorber component involved, preferably the piston rod, will impact on where the resilient blade holder comes to rest even before the holder can arrive in the vicinity of the stop itself.

The blade holder may tend, especially when even just one of the springs in the preferably two-spring spring assembly breaks, to pivot in the counter-stop direction. To cope with such a malfunction, the backward-extending section of the upward-extending arm of the blade-adjustment lever in one preferred embodiment has been provided with a backward-travel preventer, a nose, that will intercept the motion of the blade holder.

In another preferred embodiment, a shock-absorption mechanism is associated with the stop to ensure superimposition of the force-over-distance curves, especially in series connection and especially when the stop is equipped with an impact attenuator with an attenuating curve that differs from that of the shock-absorption mechanism. It is preferable in this event for the shock-absorption mechanism to be more rigid than the spring assembly (tension springs) that engages the blades, allowing adjustment of the angle of insertion to be assumed by the spring assembly, with the shock-absorption mechanism not undergoing deformation. The shock-absorption mechanism is for this purpose preferably prestressed accordingly. The shock-absorption mechanism is accordingly preferably located in the vicinity of the lever-displacement mechanism, engaging the upward-extending arm of the blade-adjustment lever. The shock-absorption mechanism can be a compression spring, especially a helical compression spring, mounted with its seats coaxial over the shaft of an adjustment component in the form of a screw, whereby the upward-extending arm of the blade-adjustment lever is articulated to a linkage component that slides back and forth along the shaft and whereby the motion of the linkage component along the shaft is limited subject to the force of the compression spring, further compressed if desired by a position-fixing component.

BRIEF DESCRIPTION OF THE DRAWINGS

Embodiments of the present invention will now be specified by way of example with reference to the accompanying drawing, wherein FIG. 2a is a side view and FIG. 2b a partly sectional top view of part of another embodiment, FIG. 3a is a side view and FIG. 3b a partly sectional top view of part of a third embodiment, FIG. 4a is a side view and FIG. 4b a partly sectional top view of part of a fourth embodiment, FIG. 5a is a side view and FIG. 5b a partly sectional top view of part of a fifth embodiment.

DESCRIPTION OF THE PREFERRED EMBODIMENTS

Figure 1:
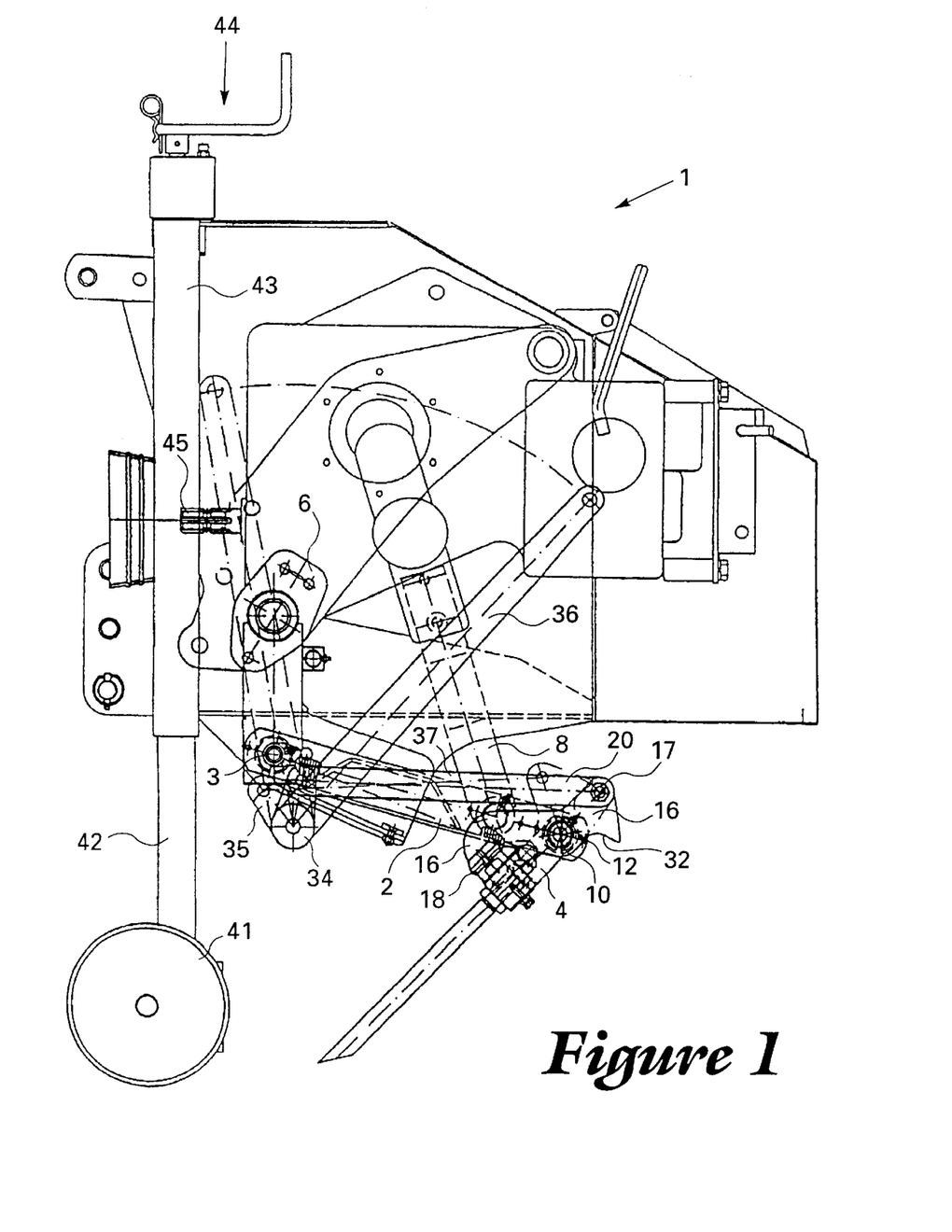
FIG. 1 is a schematic side view of one embodiment.

The implement 1 for deeply loosening soil illustrated in FIG. 1 is intended for attachment to a tractor. Since implements of this genus are generally known, only the components and characteristics necessary to the particular implement's function and for purposes of illustration will be specified hereinafter, with express reference only to the embodiments depicted as a whole in accordance with the present invention.

Implement 1 is provided with a frame 6. The forward, in the direction of travel, end of a supporting arm 2 is articulated to a pivot 3 secured to frame 6. A blade is accommodated and can be replaced in a blade holder 4 at the backward-extending end of supporting arm 2. A row or set of such blades extends in conjunction with its associated supporting arms, blade-adjustment levers, and cranks across the direction of travel and parallel to the ground. The blades are regularly, preferably sequentially and in pairs, inserted into and retracted from the soil. Only one such set of blades and blade holders will be specified along with its associated accessories hereinafter.

Each blade holder 4 pivots around a pivot 10 in the backward-extending end of an associated supporting arm 2 facing away from framework-fixed pivot 3. A two-armed blade-adjustment lever 12 pivots coaxial with shaft 10 on supporting arm 2. Mounted on the downward-extending arm 14 of lever 12 is a stop 18. Stop 18 points toward a supporting surface on blade holder 4, by means of which it impacts stop 18 in the same direction as a result of its coaxial articulation to supporting arm 2 at any angle of blade-adjustment lever 12 to supporting arm 2, accordingly minimizing the wear in this area. Articulated to the free end of the upward-extending arm 16 of blade-adjustment lever 12 at articulation 17 is a lever-adjusting mechanism 20. Various versions of mechanism 20 will be specified hereinafter. Articulated in the vicinity of shaft 10 is the driving rod 8 of an only sketchily depicted crank mechanism. This mechanism repeatedly pivots the supporting arm around pivot 3 in a known procedure, introducing the blade into and withdrawing it from the soil, whereby the blade is also advanced to the left in the illustration and around shaft 10 by the stop as the unillustrated tractor moves forward. As the blade or blade holder 4 is lifted out of the soil, it is again brought into contact with the stop, specifically subject to the force exerted by a spring assembly 22, of which there can also be various embodiments and which extends in particular between a point of engagement on blade holder 4 and below shaft 10 and another point of engagement at least in the vicinity and preferably along the axis of the pivot 3 that supporting arm 2 pivots around. In some situations, especially in the event of at least partial breakage of spring assembly 22, the blade holder may pivot backwards, against, that is, the direction in which it rests against stop 18. This motion will be limited as will be evident from the figure by a backward-travel preventer 32 in the form of a nose on blade-adjustment lever 12. The depth that the blade penetrates into the soil to can be adjusted by varying the distance of frame 6 from the ground at its three-point attachment to the tractor with a supporting roller 41 attached to an upright 42 that telescopes into and out of a tube 43 by means of a threaded shaft 44 that extends between upright 42 and tube 43. The only sketchily represented crank mechanism can be pivoted away from the tractor by a journal mechanism at input end 45.

Figure 2:
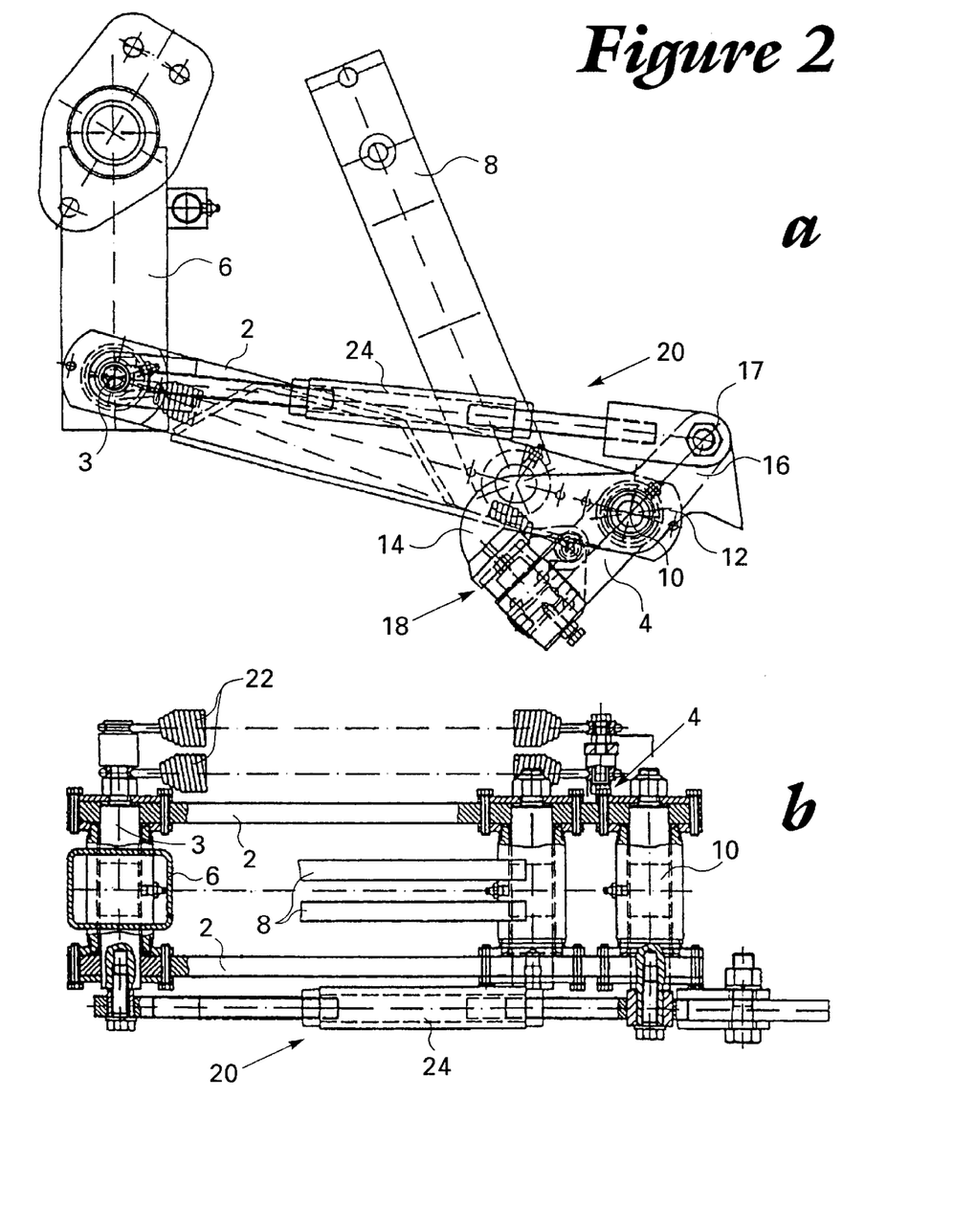

The lever-adjusting mechanism 20 in the embodiment illustrated in FIG. 2 is provided with a longitudinally adjustable component in the form of a tensioning-screw locking mechanism 24 between the free end of upward-extending arm 16 and the pivot 3 fixed to the frame, that, when turned, due to its right-to-left threading, varies the distance between the articulation 17 on upward-extending arm 16 and pivot 3, accordingly varying the angular position of blade-adjustment lever 12 and hence of the stop 18 on its downward-extending arm 14, by which means the angle of insertion into the soil of the unillustrated blade accommodated in blade holder 4 can be adjusted. As will be evident from FIG. 2b, spring assembly 22 comprises two parallel and mutually operating tension springs extending between points of engagement on pivot 3 and blade holder 4. Both springs are attached along one side of two-armed supporting arm 2, with lever-adjusting mechanism 20 along the other.

Figure 3:
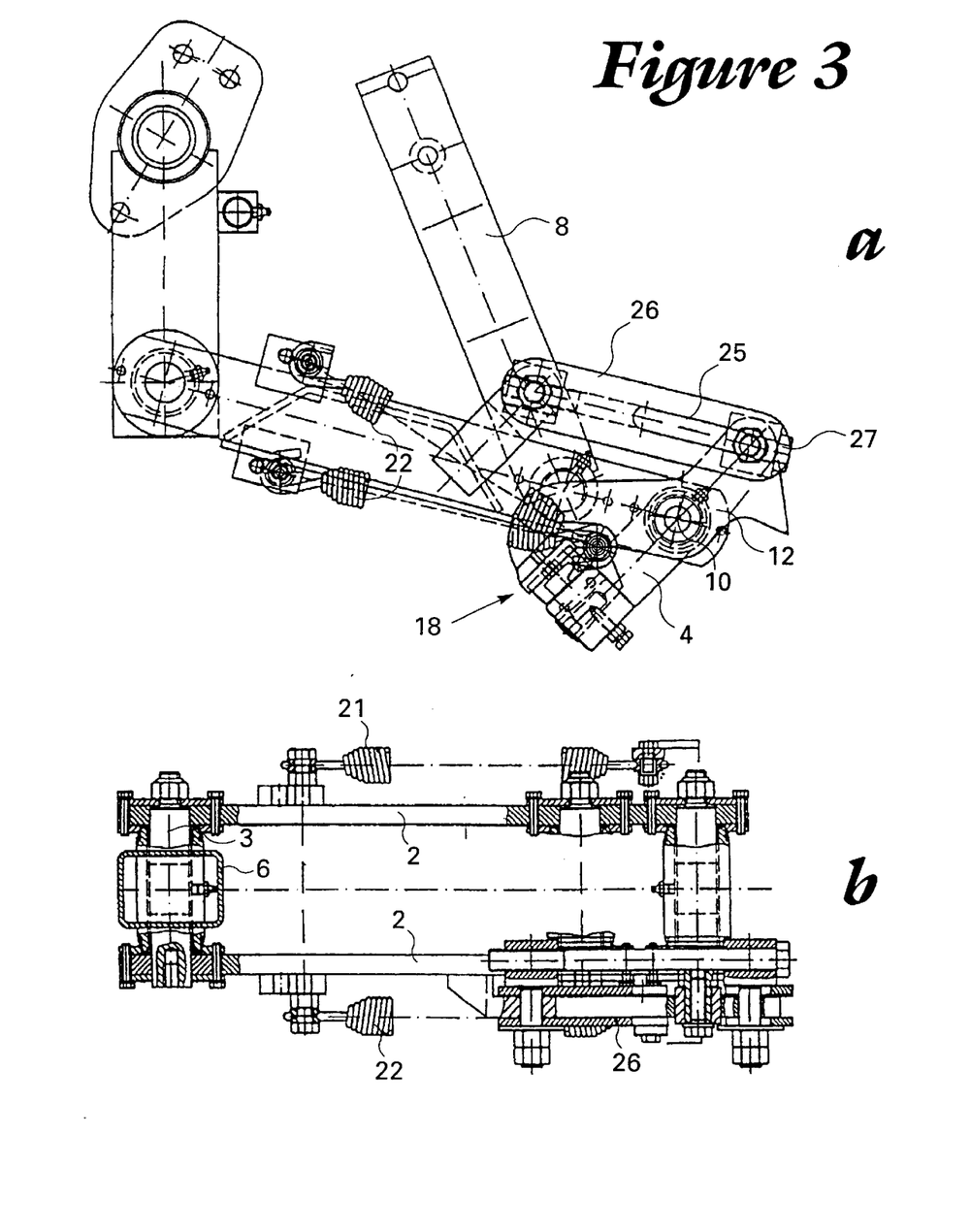

The lever-adjusting mechanism 20 illustrated in FIG. 3 has a thread-adjustable linkage 26 wherein a screw with a head 27 can be turned from the rear and free side of the supporting arm, allowing adjustment within the scope of a slot 25 between where the head is seated and a screw-shaft thread nut. The spring assembly 22 in this embodiment as well comprises two parallel and mutually operating springs and extends as will be evident from the figures along both sides of the two-strut supporting arm 2.

Figure 4:
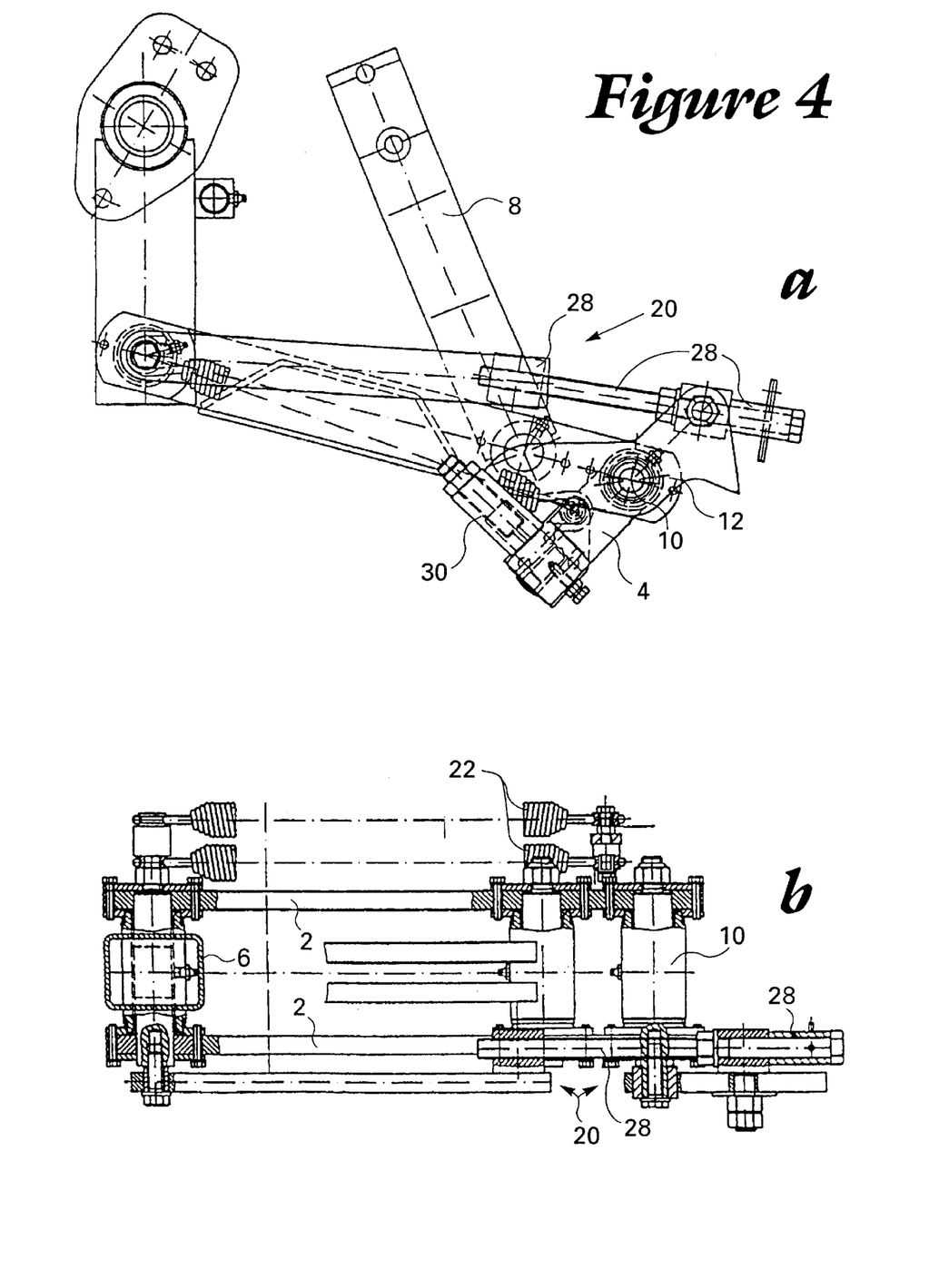

The embodiment illustrated in FIG. 4 includes a longitudinally variable adjusting link that differs from the one illustrated in FIG. 3, comprising a threaded mechanism accessible from behind the rear end of the supporting arm. Spring assembly 22 and the adjustment mechanism on each side of supporting arm 2 are disposed similarly to those illustrated in FIG. 2. Stop 18 is provided with a shock absorber 30 that will be specified in greater detail with reference to FIG. 6.

Figure 5:
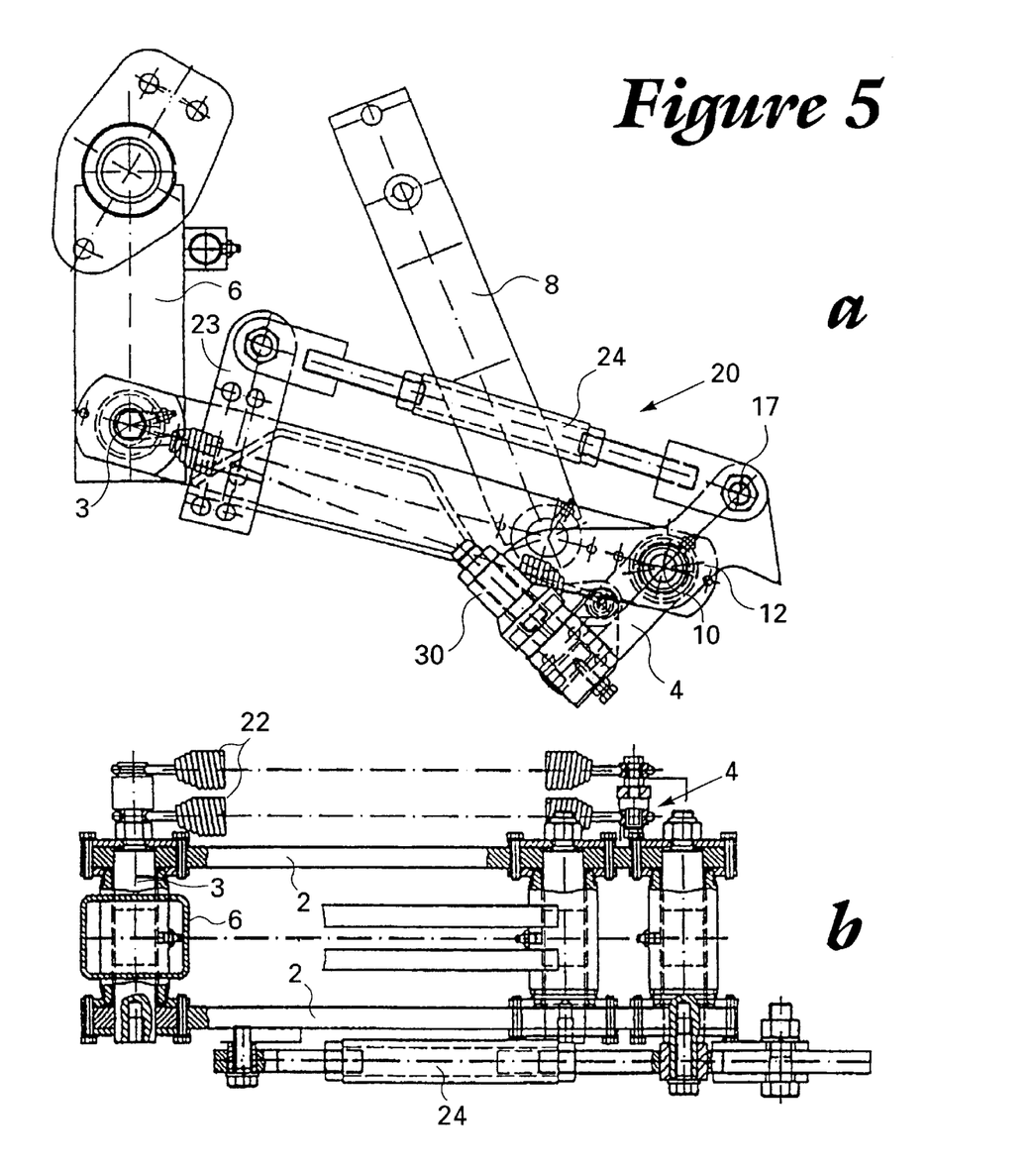

The embodiment illustrated in FIG. 5 differs from that illustrated in FIG. 2 in that the frame-side accommodation for spring assembly 22 extends along a boom 23 on supporting arm 2. The stop in this embodiment is also provided with a shock absorber 30.

Figure 6:
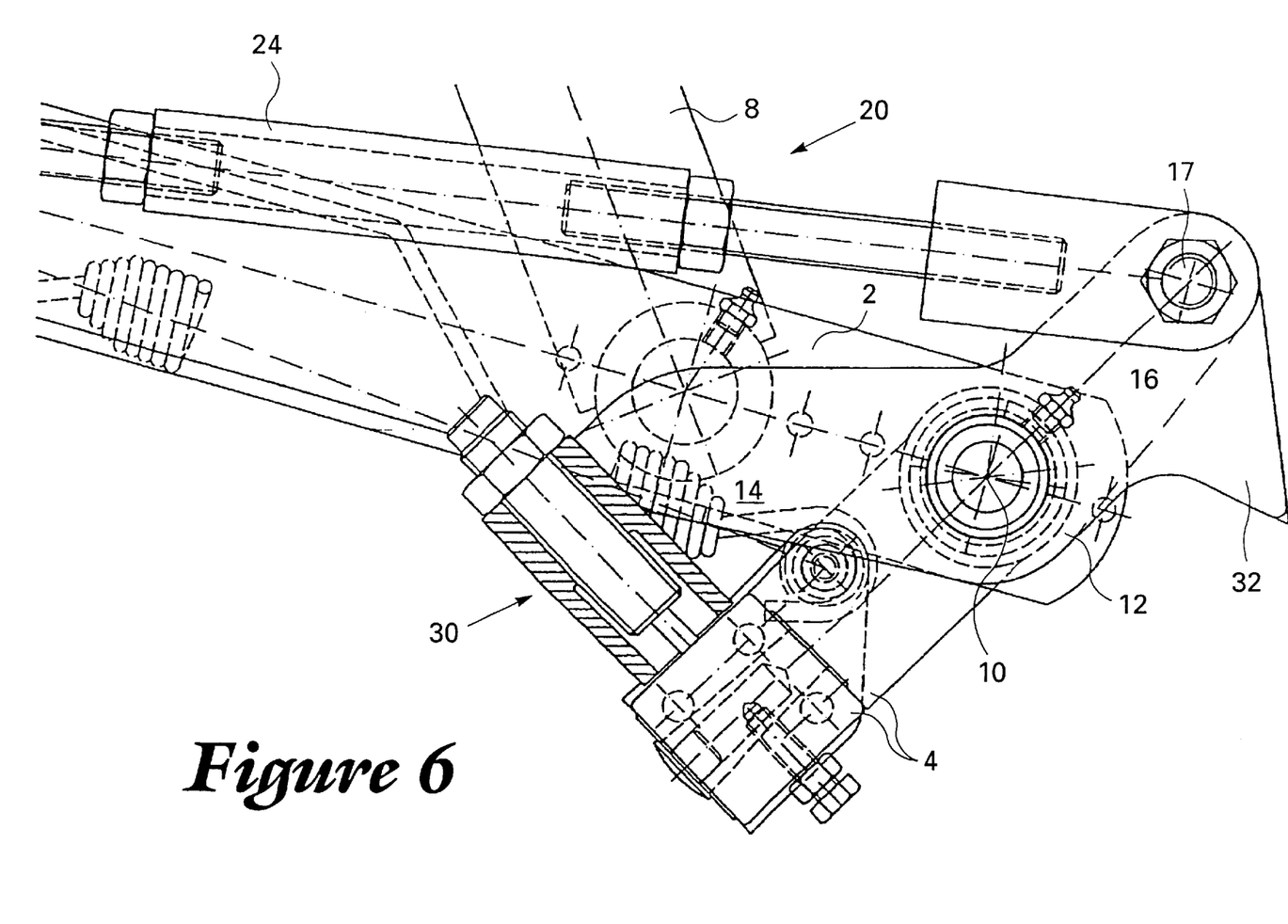
FIG. 6 is a larger-scale detail of the side view in FIG. 5a employing the guided adjustment member illustrated in FIG. 2a, FIG. 7a is a side view and FIG. 7b a partly sectional top view of parts illustrating how the embodiments illustrated in FIGS. 1 and 8 are adjusted.

FIG. 6 is a larger-scale side-view detail illustrating the coaxial arrangement of blade holder 4 and blade-adjustment lever 12 in conjunction with a stop 18 and a hydraulic shock absorber 30. The cylinder that accommodates the piston screws parallel to the rod into and out of a threaded section of a sleeve and can be secured by a counternut facing away from the ground. The inside of the cylinder is protected from contamination by a bellows between its wall and the piston rod. A stop that is preferably cushioned in this way can be installed without risk and with no need for maintenance in the vicinity of the downward-extending arm of blade-adjustment lever 12. The adjustability provided by the threaded connection between the outer surface of the cylinder and the inner surface of the surrounding sleeve allows establishment of how far the piston rod can extend beyond the face of the sleeve, which faces the stop in the form of the supporting surface of blade holder 4, in order to obtain the desired level of shock absorption. The attenuation and readjustment of the shock absorber can be coordinated by means of a bypass valve.

Figure 7:
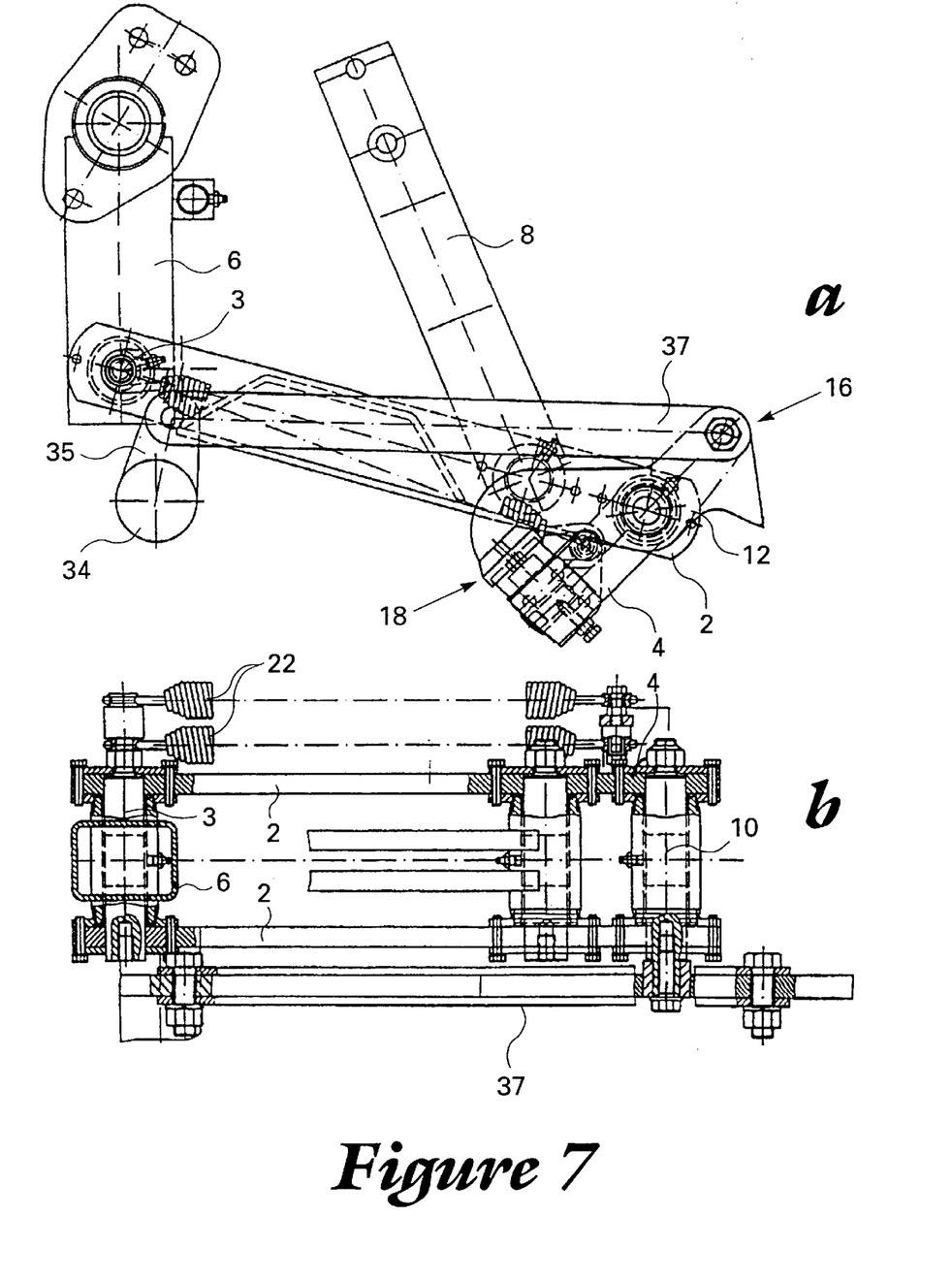

FIG. 7 is a larger-scale detail of one basic embodiment of lever-adjusting mechanism 20 that can vary the angle of insertion of all the blades simultaneously in one motion. This embodiment includes for this purpose a central lever-shifting shaft 34 with booms 35 mounted tight on it. Each boom is articulated to the upward extending arm 16 of its associated blade-adjustment lever 12 by way of a connecting rod 37. Central lever-shifting shaft 34 is fixed to the frame and below the pivots 3 for supporting arms 2 in an unillustrated manner. It will be evident that the blade-adjustment levers 12 can pivot as the shaft pivots around each boom 35, only one of which is illustrated, and around the connecting rods 37. Not all the blades need to be connected to the central articulating shaft of course. It is basically alternatively possible to vary the angle of only one blade holder or of only one row at a time.

FIG. 1 illustrates an embodiment with a central lever-shifting shaft that pivots around a lever 36 to establish the angle of insertion. The depth of penetration can be established with a threaded shaft 44 and manually operated crank as hereintofore specified.

Figure 8:
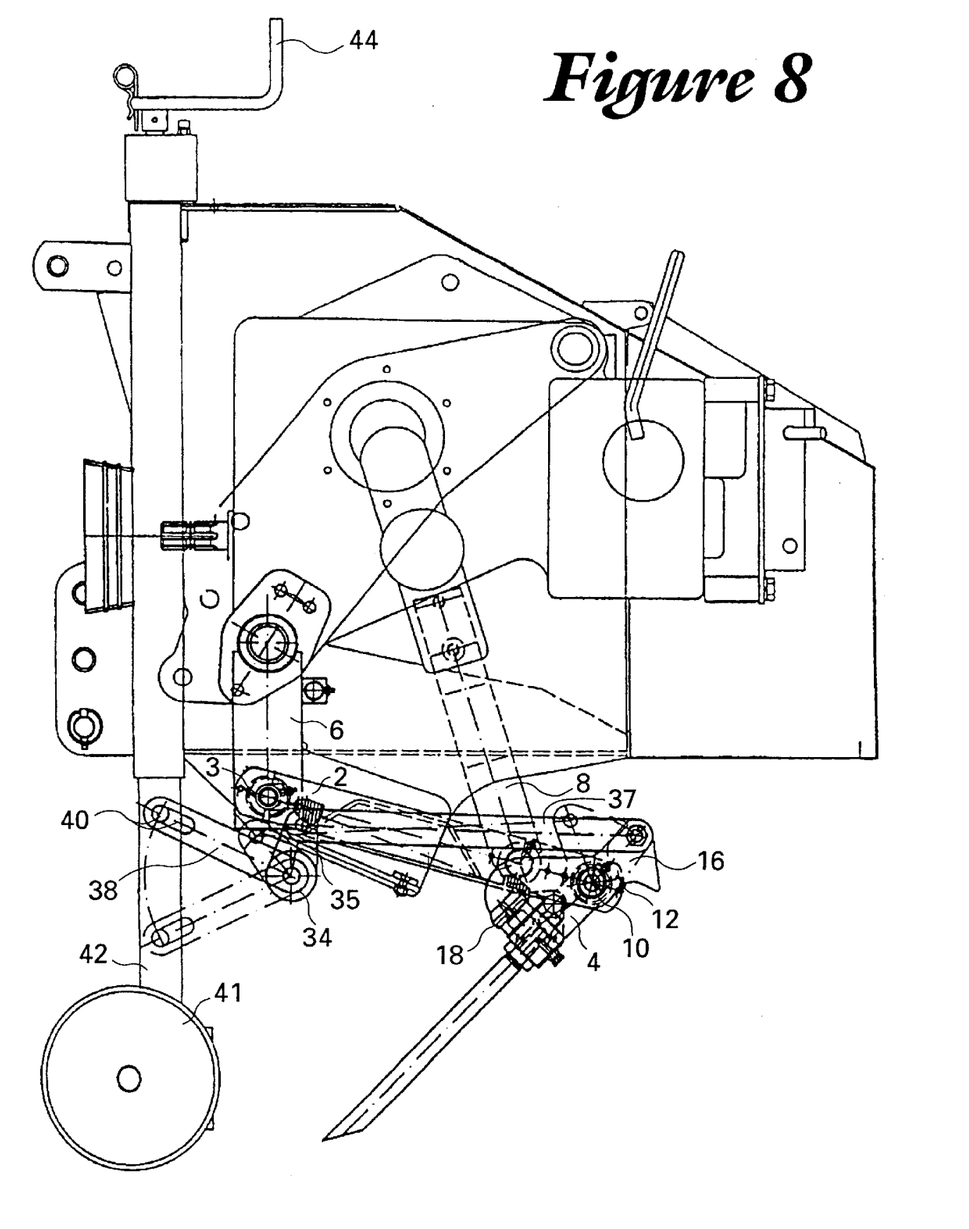
FIG. 8 is a side view similar to FIG. 1 of a sixth embodiment.

FIG. 8 illustrates a final embodiment, similar to that illustrated in FIG. 1, wherein, instead of manually operated lever 36, a laterally extending pickup 38 is mounted tight on central lever-shifting shaft 34 and engaged by supporting-roller upright 42 by way of a slot-and-pin system 40. Adjustment of the depth of penetration of the blade into the soil by turning manually operated crank 44 is accordingly necessarily coupled to adjustment of the angle of penetration, and both can be established in a single operation, whereby the interconnection of depth and angle must necessarily be taken into account.

Figure 9:
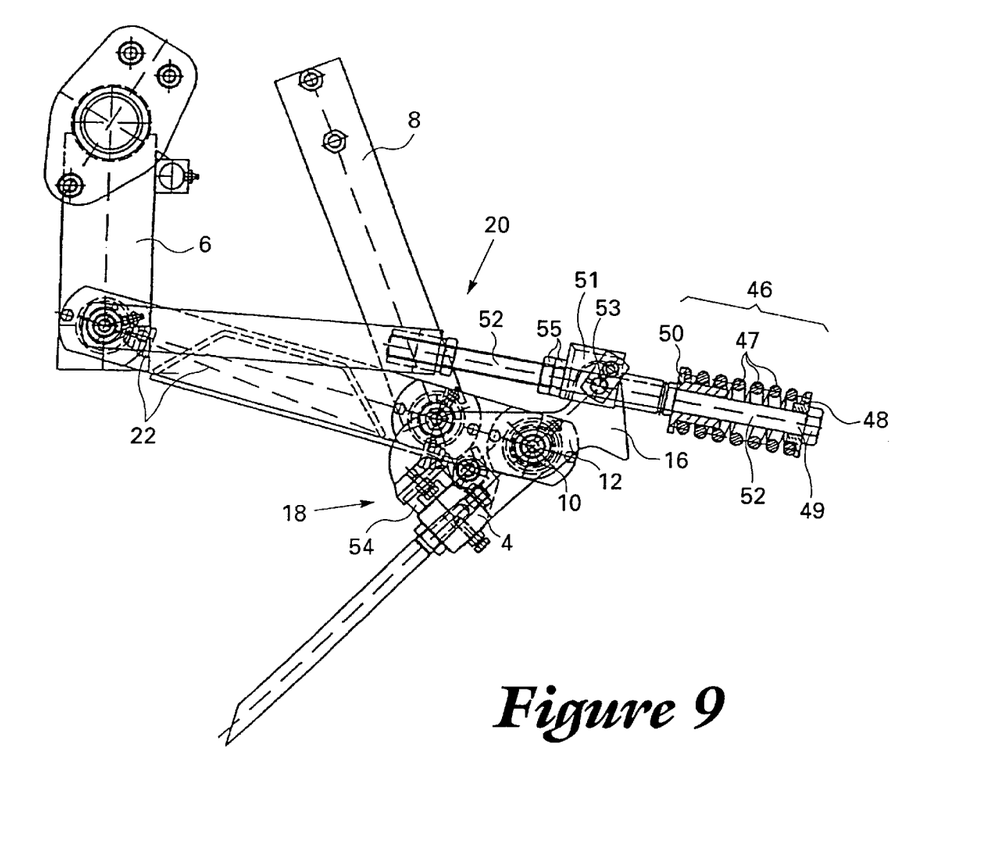
FIG. 9 is a side view of part of a seventh embodiment.

Although the mechanisms illustrated in side-view detail in FIG. 9 are intended for use with the embodiment illustrate in FIG. 4, they can also be used with the others. This embodiment is particularly characterized in that the upward extending arm 16 of blade-adjustment lever 12 is not rigidly fastened to lever-adjusting mechanism 20, but is coupled to it by way of a shock-absorption mechanism 46 that parallels the action of stop 18. In the illustrated and preferred version, shock-absorption mechanism 46 is in the form of a helical compression spring 47 that is connected by way of a seat 48 at one end to lever-adjusting mechanism 20, which is in the form of a screw 49 that extends outward and backward, and by way of another seat 50 and of a linkage component 51 at the other end to the upward extending arm 16 of blade-adjustment lever 12. The travel of linkage component 51 is limited by a position-fixing component 55 constituted of counternuts on the side facing away from helical compression spring 47, and the spring can accordingly be tensioned by varying the position of the position-fixing component.

Since linkage component 51 is articulated to the upward extending arm 16 of blade-adjustment lever 12 at an articulation 53, the pivoting motion of blade-adjustment lever 12 accompanied by the motion of blade holder 4 against stop 18 will be transmitted by way of seat 50 to helical compression spring 47, which rests by way of seat 48 against the head of screw 49. The force exerted by spring assembly 22 will, while the blade or blade holder 4 rests against the stop 18 on blade-adjustment lever 12, counteract the force exerted by helical compression spring 47. Since helical compression spring 47 is stiffer and/or farther stressed than spring assembly 22, the angle of insertion of blade holder 4 can be established precisely and not roughly, as would be the case in principle with respect to weaker compression springs.

Stop 18 is provided with an impact attenuator 54. Since the performance of impact attenuator 54 differs from that of the shock-absorption mechanism represented by helical compression spring 47, the different frequency shifts will provide a "wide range of attenuating frequencies" to counteract the varying loads on blade-adjustment lever 12.

The shock-absorption mechanism (helical compression spring 47) will make additional attenuation available as blade holder 4 properly impacts the stop 18 on blade-adjustment lever 12. Furthermore, the blades will be protected against excess load when for example the vehicle is backing up and they encounter a stone or other obstruction or when the vehicle is moving forward and they are prevented from entering the soil and slip forward. Finally, the blades will lower more rapidly toward the ground when at an angle. During all these operations, the shock-absorption mechanism (helical compression spring 47) will ensure avoidance on the part of the blades and accordingly prevent damage to them. Such a shock-absorption mechanism will on the whole ensure essentially more rapid operation.

What is claimed is:

1. A movable implement for loosening soil below ground, comprising: a row of blades with blade holders perpendicular to a direction of motion of said implement; a supporting arm having one end articulated to each of said blades; a frame articulated to another end of said supporting arm; a connecting rod of crank means engaging said supporting arm and operating in a vertical plane parallel to said direction of motion; a blade adjustment lever with two arms mounted on said supporting arm and pivoting coaxially with an articulating shaft; a stop mounted on a downward-extending arm of said blade-adjustment lever and pointing below said articulating shaft; lever-adjusting means engaging an upward-extending arm of said blade-adjustment lever and having a variable angle to said supporting arm and varying thereby the angle of the blade to said ground; spring means forcing a blade holder for said blades against said stop; said soil exerting a resistance forcing said blades away from said stop during movement of said implement.

2. A movable implement as defined in claim 1, wherein said spring means is tensionable between said blade holder and a frame-fixed pivot of said supporting arm.

3. A movable implement as defined in claim 1, wherein said spring means is located adjacent said supporting arm and comprises two parallel struts and two parallel springs.

4. A movable implement as defined in claim 1, wherein said lever adjusting means extends between one point of engagement on said upward extending arm of said blade-adjustment lever and another point of engagement adjacent said frame-fixed pivot along an axis of articulation.

5. A movable implement as defined in claim 4, including variable-length means comprising tension-screw locking means, a thread-adjustable linkage actuatable from a head side of said supporting arm facing away from said frame-fixed pivot, and threaded means between said two points of engagement and actuatable by said supporting arm.

6. A movable implement as defined in claim 5, including a central lever-shifting shaft on said thread adjustable linkage and connected to said upward extending arm of said blade-adjustment lever by a lateral boom and by an adjustment linkage, said central lever-shifting shaft being connected also to all blade adjustment levers adjusting blade holders by associated booms, said central lever-shifting shaft pivoting on said frame adjacent a pivot of said supporting arm.

7. A movable implement as defined in claim 5, wherein said central lever-shifting shaft is continuously transferable into different positions; and a securing lever for securing said central lever-shifting shaft in any one of said different positions for establishing various angles of insertion of said blades into the soil.

8. A movable implement as defined in claim 6, wherein said central lever-shifting shaft is connected to displacement means through a non-rotating laterally extending pickup on an upright associated with wheel means resting on the ground for establishing depth of a blade in the soil, and a threaded shaft for raising and lowering said upright relative to said frame.

9. A movable implement as defined in claim 1, including a shock absorber adjacent said stop and mounted on said downward extending arm of said blade-adjustment lever along with a piston rod displaceable parallel to the direction of impact of the blade holder, said piston rod being in dust-tight piston-and-cylinder means.

10. A movable implement as defined in claim 1, including a backward-travel preventer having a nose extending substantially toward said supporting arm adjacent to said upward-extending arm of said blade-adjustment lever and intercepting the blade holder when said spring means breaks.

11. A movable implement as defined in claim 1, including shock-absorption means associated with said stop.

12. A movable implement as defined in claim 11, wherein said shock-absorption means is prestressed and is stiffer and has a steeper force-per-distance characteristic than said spring means engaging said blade holder.

13. A movable implement as defined in claim 11, wherein said shock-absorption means is mounted on said upward extending arm of said blade-adjustment lever adjacent to said lever-adjusting means.

14. A movable implement as defined in claim 13, wherein said shock absorption means comprises a helical compression spring mounted through seats coaxially around a shaft of said lever-adjusting means in form of an adjustment screw; linkage means sliding back and forth along said shaft of said lever-adjusting means and articulated to said upward extending arm of said blade adjustment lever; position-fixing means for applying tension to a spring exerting a force to limit travel of said linkage means along said shaft of said lever-adjusting means.

15. A movable implement as defined in claim 11, including an impact attenuator with attenuation characteristics differing from that of said shock-absorption means.

16. A movable implement for loosening soil below ground, comprising: a row of blades with blade holders perpendicular to a direction of motion of said implement; a supporting arm having one end articulated to each of said blades; a frame articulated to another end of said supporting arm; a connecting rod of crank means engaging said supporting arm and operating in a vertical plane parallel to said direction of motion; a stop and spring means acting against said stop, said soil exerting a resistance against said spring means during movement of said implement; lever-adjusting means for adjusting said stop to set the angle of insertion of said blade holders into the ground; a central lever-shifting shaft having an associated boom and connected to at least a part of said blade holders through blade adjustment levers; said central lever-shifting shaft pivoting on said frame adjacent a pivot on said supporting arm.

17. A movable implement as defined in claim 16, wherein said central lever-shifting shaft is continuously transferable into different positions; and a securing lever for securing said central lever-shifting shaft in any one of said different positions for establishing various angles of insertion of said blades into the soil.

18. A movable implement as defined in claim 16, wherein said central lever-shifting shaft is connected to displacement means through a non-rotating laterally extending pickup on an upright associated with wheel means resting on the ground for establishing depth of a blade in the soil, and a threaded shaft for raising and lowering said upright relative to said frame.

* * * * *